US006242552B1

(12) United States Patent
Su

(10) Patent No.: US 6,242,552 B1
(45) Date of Patent: Jun. 5, 2001

(54) STAMP ADHESIVE

(75) Inventor: Shiaonung Su, Cerritos, CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/443,571

(22) Filed: Nov. 19, 1999

(51) Int. Cl.[7] ............................ C08F 22/14; C08F 20/18; C08F 20/06; C08F 18/08
(52) U.S. Cl. ......................................................... 526/318.43
(58) Field of Search ........................................ 526/318.43

(56) References Cited

U.S. PATENT DOCUMENTS

| 4,564,664 | * | 1/1986 | Chang et al. | 526/318.43 |
|---|---|---|---|---|
| 5,164,444 | | 11/1992 | Bernard | 524/833 |
| 5,183,459 | | 2/1993 | Bernard | 602/52 |
| 5,189,126 | | 2/1993 | Bernard | 526/261 |
| 5,264,532 | | 11/1993 | Bernard | 526/261 |
| 5,278,227 | * | 1/1994 | Bernard | 526/318.43 |
| 5,296,279 | | 3/1994 | Birnbaum et al. | 428/42 |
| 5,503,436 | | 4/1996 | Alpaugh et al. | 283/71 |

FOREIGN PATENT DOCUMENTS

WO 98/24825   6/1998  (WO).

* cited by examiner

*Primary Examiner*—Peter Szekely
(74) *Attorney, Agent, or Firm*—Christie, Parker & Hale, LLP

(57) ABSTRACT

General purpose permanent, environmentally benign, pressure-sensitive adhesives and self-adhesive postage stamps and other laminate constructions are provided. In one embodiment, the PSA is an inherently, acrylic copolymer prepared by emulsion polymerization of 27 to 29% di-(2-ethylhexyl) maleate, 19 to 21% vinyl acetate, 40 to 43% ethylhexyl acrylate, 5 to 10% methyl methacrylate, 1% acrylic acid, and 1% methacrylic acid. Notably, no multi-functional monomers having a cyanurate or phosphate moiety are included in the polymer, and the polymer is substantially uncrosslinked.

1 Claim, No Drawings

STAMP ADHESIVE

FIELD OF THE INVENTION

This invention relates to a unique pressure-sensitive adhesive, self-adhesive postage stamps, and other constructions made with the adhesive.

BACKGROUND OF THE INVENTION

Since their introduction a few years ago, self-adhesive postage stamps have enjoyed tremendous popularity. In a typical construction, a sheetlet of self-adhesive postage stamps includes a laminate of an array of postage stamps made of a die-cut face stock, printed on one side with postage indicia, adhered to a release liner by a pressure-sensitive adhesive (PSA). U.S. Pat. No. 5,296,279 (Birnbaum et al.), assigned to Avery Dennison Corporation, is representative. ATM-dispensable, self-adhesive postage stamps are also known, and are disclosed in U.S. Pat. No. 5,503,436 (Alpaugh et al.), also assigned to Avery Dennison Corporation. Both patents are incorporated herein by reference.

The United States Postal Service (USPS) sets standards for United States-issued postage stamps. Government specification USPS-P-1238C (Jan. 24, 1996), which is incorporated by reference herein, identifies and describes certain "required," "target," and to-be-"monitored" properties of face stocks, adhesive layers (PSAs) and release liner backings (as well as linerless release coatings) to be used in self-adhesive postage stamps. An important property of self-adhesive postage stamps is the ability to form a permanent adhesive bond, after a short dwell time, to a variety of substrates, including woven paper, regular kraft, corrugated board, polyethylene based envelope stock (e.g., Tyvek®, sold by DuPont de Nemours, E.I., Co. of Wilmington Del.), and other materials commonly used in envelopes and parcels. To deter theft and re-use of stamps, it is desirable that the adhesive leave a telltale fiber tear mark on the paper envelope or package if attempts are made to remove the stamp.

Although progress has been made in the area of self-adhesive postage stamps, a need for improved adhesives and theft-deterring stamp constructions continues to exist. In addition, the USPS has expressed a desire for "environmentally benign" self-adhesive postage stamps that can be recycled during ordinary paper recycling processes, or at least easily removed from envelope substrates prior to repulping and other recycling processes.

It is well-known that many PSAs contribute to the formation of what are commonly referred to in the trade as "stickies." Stickies tend to deposit on the felts, wires, drier cans, and other paper machine parts, and disrupt the smooth operation of paper machines. They also degrade the functional and cosmetic properties of paper products made with recycled paper filer. A need exists for self-adhesive stamps that either do not contribute to stickies formation or can be easily removed, preferably with water, before waste envelopes and parcels are repulped and recycled.

SUMMARY OF THE INVENTION

According to the present invention, there is provided an improved, general purpose permanent, environmentally benign, pressure-sensitive adhesive (PSA) that is ideal for use in self-adhesive postage stamps and other PSA constructions. The new PSA adheres well to most substrates used in postal application, including natural kraft, white woven, and recycled paper. Stamps and other constructions made with the new PSA are water-removable from a variety of substrates. In one embodiment, the PSA comprises an inherently tacky, acrylic copolymer prepared by emulsion or solvent polymerization of a monomer mixture comprising, on a percent by weight basis, based on the total weight of monomers, about 27 to 29% di-(2-ethylhexyl) maleate, 19 to 21% vinyl acetate, 40 to 43% ethylhexyl acrylate, 5 to 10% methyl methacrylate, 1% acrylic acid, and 1% methacrylic acid.

The present invention also provides self-adhesive postage stamps and other adhesive laminate constructions, including bulk mail stamps, address change labels, etc., made with the unique PSA. The constructions are conveniently prepared by coating or otherwise applying the PSA to a protective release liner, laminating the coated release liner to a suitable face stock having opposed first and second faces, and die-cutting the construction to form individual stamps or labels. Alternatively, the PSA is applied directly to a face stock, protected with a release liner, and die-cut. In some embodiments, either or both faces of the face stock are imprinted with, or imprintable with, postage indicia. When applied to an envelope substrate, such as a woven paper envelope, and then removed from the envelope, the self-adhesive postage stamps leave a fiber tear mark on the envelope, even after only very short dwell times (as little as five minutes or less).

The new adhesive has a low creep compliance and performs well in adhesive permanence and accelerated aging testing, over a range of temperatures and humidities. Constructions prepared with the adhesive also convert well, as a consequence of the adhesive's low creep compliance and excellent sheer characteristics. In addition, the adhesive is repulpable and is qualified as a screenable adhesive.

DETAILED DESCRIPTION

In one embodiment of the invention, an inherently tacky, acrylic PSA copolymer is made from a plurality of monomers comprising, on a percent by weight basis, based on the total weight of monomers, (a) about 27 to 29% di-ethylhexyl maleate, (b) about 19 to 21% vinyl acetate, (c) about 40 to 43% ethylhexyl acrylate, (d) about 5 to 10% methyl methacrylate, (e) about 1% acrylic acid, and (f) about 1% methacrylic acid. In a preferred embodiment, the copolymer is uncrosslinked, and the plurality of monomers contains substantially no multifunctional monomers having a cyanurate of phosphate moiety. That is, such monomers should be completely excluded or present in such a low amount that they cause no perceptible crosslinking.

The PSA copolymer is prepared by free radical emulsion polymerization, in the presence of a mixture of anionic and nonionic surfactants, a reactive (copolymerizable) surfactant such as sodium vinyl sulfonate, and at least one polymerization initiator. Preferred surfactants include both anionic and nonionic surfactants and stabilizers, including, without limitation, alkyl phenol ethoxylates and sodium alkyl phenol ethoxylate sulfates. Particularly preferred are POLYSTEP® surfactants from Stepan Company Inc. (Winnetka, Ill.), especially a mixture of POLYSTEP F-9 (a nonylphenol ethoxylate containing approximately thirty moles of ethylene oxide (EO) per mole of surfactant molecule) and POLYSTEP B-27, (a sodium nonylphenol ethoxylate sulfate containing approximately four moles EO per mole of surfactant molecule). The anionic and nonionic surfactants are included in the formulation in an amount sufficient to form a stable emulsion without causing phase separation.

A reactive surfactant, such as sodium vinyl sulfonate or a comparable alkali metal salt of an alpha-olefin sulfonic acid, is also preferably included in the polymerization reaction. A non-limiting example of such a surfactant is POLYSTEP A-18, a linear, sodium alpha-olefin sulfonate available from Stepan Company.

Nonlimiting examples of polymerization initiators include persulfates, such as sodium persulfate ($Na_2S_2O_8$), potassium persulfate, and peroxy persulfates; peroxides, such as tert-butyl hydroperoxide (t-BHP); and azo compounds such as VAZO™ initiators; used alone or in combination with one or more reducing components or activators, such as bisulfites, metabisulfites, ascorbic acid, erythorbic acid, sodium formaldehyde sulfoxylate, ferrous sulfate, ferrous ammonium sulfate, etc. The activator is believed to form a redox couple with the initiator and promotes faster generation of free-radicals. Preferably, a small amount of base, e.g., ammonia, sodium hydroxide, sodium bicarbonate, etc. is added to the initiator and functions as a buffer. The base appears to stabilize the emulsion polymerization.

A defoamer, such as Drewplus L-191 (Ashland Chemical Co., Columbus, Ohio); a biocide, such as Kathon LX (available as a 1.5% solution from Rohm & Haas, Philadelphia, Pa.); and other agents well-known in the art of emulsion polymer formulation also can be added as desired. Emulsion polymerization is carried out with excellent yields at a reaction temperature of from about 70 to 85° C., in the presence of about 0.5 to 1.0% by weight of a persulfate or other initiator (based on the weight of monomers), with the monomers being fed into the reactor over a period of three to four hours. Generally, emulsion polymerization is carried out by making a pre-emulsion of monomers; charging a reactor, which is heated and initially purged with nitrogen; continually feeding an emulsified mixture of monomers to the reactor; and adding the initiator to the reactor in a stepped or ramped feed. In some embodiments of the invention, the initiator is introduced slowly at first, and then more quickly as the reaction proceeds. The initially formed polymers tend to have a low gel content and a high molecular weight non-gel fraction, while the polymers formed at subsequent stages of the reaction tend to have a somewhat higher gel content and a lower molecular weight soluble fraction. In an alternate embodiment of the invention, an emulsion polymer is prepared by sequential polymerization, in which the monomers are emulsified and allowed to react in distinct stages. To that end, separate pre-emulsions of monomers, surfactants, initiators and other components are prepared, a reactor is charged with an initial soap (surfactant) solution and catalyst (initiator) solution, a first pre-emulsion of monomers is gradually fed into the reactor, and polymerization is initiated and allowed to propagate. After polymerization of the first pre-emulsion, a second pre-emulsion of monomers is gradually fed into the reactor and polymerization continues. The result is a copolymer system of emulsified copolymer particles quite distinct from emulsion copolymers prepared by batch polymerization. Although not bound by theory, it is believed that sequential polymerization of the two monomeric pre-emulsions results in an emulsion of domain-type copolymeric particles, each having an inner core of first copolymeric composition and an outer shell or region of second copolymeric composition, partially or totally encapsulating the core.

After polymerization is complete, it is preferred to adjust the pH of the emulsion to about six to eight by adding ammonia or another base.

Overall number average molecular weights ($M_n$) of the polymers' soluble fractions tend to lie within the range of about 2,000 to 10,000. Weight average molecular weights ($M_w$) tend to range from about 40,000 to 70,000. Gel content is preferably kept to between 30 and 60% by weight. If the gel content is too low, the adhesive shear strength suffers. (A PSA containing no MMA and having a 20% gel content exhibited very poor shear: about 1 to 2 minutes.) If gel content is too high, the polymerization product can be gritty and difficult to filter, and the PSA can exhibit poor cutting/converting performance.

In another aspect of the invention, the emulsion polymerization products and methods described herein are used to prepare inherently tacky, PSA constructions such as tapes, labels, and especially self-adhesive postage stamps. To that end, an emulsion acrylic copolymer is coated on or otherwise applied to a release liner, dried and married or laminated to a paper, plastic film, or other flexible face stock. Alternatively, the emulsion copolymer is directly applied to a face stock, dried, and then married or laminated to a release liner. Linerless PSA constructions can also be prepared using the PSAs described herein.

Bond, wove, kraft, and recycled paper are just a few examples of the many types of paper facestocks suitable for use with the PSA provided according to the present invention. Nonlimiting examples of plastic film face stocks include polyolefins, such as polyethylene and polypropylene; polyesters, such as polyethylene terephthalate (PET); and polyvinyl chloride.

Conventional release coatings and liners, well known to those skilled in the art, can be used to protect the adhesive laminate until use. Siliconized paper or film liners are particularly effective and convenient to make and use.

Postage stamps can be provided in a variety of presentations, including, for example, single stamps, long strips suitable for rolling, large sheets, and small sheetlets suitable for ATM dispensing. The face stocks, PSAs and release liners are made or selected to comply with the requirements, if any, of stamp-issuing governments. For instance, the requirements for United States stamps are provided in government specification USPS-P-1238(A-Z), where the letter indicates the particular version of the official specification. (1238C, for example, is dated Jan. 24, 1996).

For postage stamp constructions, the face stock can be imprinted with postage indicia, i.e., the picture, indication of postal value, etc., one normally associates with postage stamps, either before or after the face stock and PSA are married together.

The emulsion copolymer can be coated using conventional coating techniques, non-limiting examples of which are slot die, air knife, brush, curtain, extrusion, blade, floating knife, gravure, kiss roll, knife-over-blanket, knife-over-roll, offset gravure, reverse roll, reverse-smoothing roll, rotary screen, rod, and squeeze roll coating.

In the text and tables that follow, the following abbreviations are used:

Monomers

| | |
|---|---|
| DOM | Di-(2-ethylhexyl) acrylate |
| VAc | Vinyl acetate |
| 2-EHA | 2-ethylhexyl acrylate |
| MMA | Methyl methacrylate |
| AA | Acrylic acid |
| MAA | Methacrylic acid |

-continued

| | |
|---|---|
| Surfactants | |
| Polystep J-927 | A mixture of Polystep F-9 and Polystep B-27 |
| SVS | Sodium vinyl sulfonate |
| Initiators and Other | |
| Drewplus L-191 | Defoamer |
| DI Water | Deionized water |
| KPS | Potassium persulfate |
| Kathon LX | Biocide |
| Envelope Substrates | |
| Bond | Gilbert 25% cotton, 24 lb |
| Kraft | Signet brown kraft, 28 lb (Cat. No. 251195) |
| Recycled | Columbia, 24 lb (Cat No. CORO2) |
| Wove | Quality Park Products, 24 lb (Cat No. 90020) |

EXAMPLES

The following are representative, nonlimiting examples of the invention.

Example 1

Using the components and polymerization protocol described below, an emulsion acrylic copolymer according to one embodiment of the invention was prepared, with the following monomer weight percentages: 27.58% DOM, 19.97% VAc, 40.77% 2-EHA, 9.76% MMA, 0.96% AA, and 0.96% MAA (T=100.00), expressed on a pre-polymerization basis. Table 1 summarizes the components and their feed rate.

TABLE 1

Emulsion PSA (Example 1)

| Component | Mass (lbs.) | Notes |
|---|---|---|
| 1 DI Water | 54.68 | Initial Reactor Charge |
| 2 SVS | 2.03 | " |
| 3 Polystep J-927 | 0.19 | " |
| 4 DI Water | 56.00 | Pre-emulsion |
| 5 Polystep J-927 | 25.48 | " |
| 6 DOM | 71.38 | " |
| 7 VAc | 51.69 | " |
| 8 2-EHA | 105.53 | " |
| 9 MMA | 25.26 | " |
| 10 AA | 2.48 | " |
| 11 MAA | 2.48 | " |
| 12 Drewplus L-191 | 0.18 | Defoamer |
| 13 DI Water | 0.64 | Rinse Water |
| 14 KPS | 0.34 | Initial Catalyst Charge |
| 15 DI Water | 42.13 | Catalyst Delay |
| 16 KPS | 0.96 | " |
| 17 Sodium Bicarbonate | 0.30 | " |
| 18 DI Water | 4.61 | Cook Off Catalyst |
| 19 KPS | 0.15 | " |
| 20 Ammonia (25% soln.) | 1.63 | pH-Adjustment |
| 21 DI Water | 1.63 | " |
| 22 Kathon LX 15% | 0.42 | Biocide |

Reactor Feed (Delays)

| Component | Amount (lbs.) | Duration (min.) | Rate (lbs/min.) |
|---|---|---|---|
| Pre-emulsion (4–11) | 341.1 | 300 | 1.137 |
| Catalyst (15–17) | 43.4 | 300 | 0.145 |

Polymerization Protocol

A reactor was charged with components 1–3, the reactor agitator was set at 35 rpm, and the reactor heating jacket was set at 80° C. In a separate vessel, a pre-emulsion of components 4–11 was prepared and stirred for at least twenty minutes. To control foaming, a defoamer (component 12) was added to the pre-emulsion, deionized water was added, and the viscosity of the pre-emulsion was measured using a Brookfield viscometer (#3 spindle, 12 rpm). When the internal temperature of the reactor reached 74° C., the catalyst charge (component 14) was added to the reactor, and the nitrogen purge was turned on. After five minutes, the nitrogen purge was turned off, and the pre-emulsion and catalyst feeds (components 4–11 and 15–17) were commenced, while maintaining the batch temperature between 82 and 84° C. Reactor samples were checked after 60, 180, and 300 minutes. After all of the delays had been fed into the reactor, the heating jacket temperature was raised to 85° C., and the reactor was held at the elevated temperature for thirty minutes. Thereafter, the cook off catalyst (components 18 and 19) were added to the reactor, which was then held for another sixty minutes with agitation. The reactor contents were then cooled to 40° C., pH was adjusted by adding ammonia, and a biocide was then added to the reactor (components 20–22). By making the emulsion slightly basic, the stability of the emulsion is improved and the viscosity is increased, making the emulsion easier to coat.

The glass transition temperature, $T_g$, of the polymer is calculated (Fox Equation) to be about −22° C. The THF-soluble fraction of a polymer prepared according to the present invention had a $M_n$ of about 2,000 and a $M_w$ of about 46,000 Solids content of the polymer emulsion was about 58.4%. Gel content was about 49%.

Example 2

A second emulsion acrylic copolymer was prepared in a manner similar to Example 1, but using a sequential polymerization technique. The polymer had a monomeric composition (expressed on a pre-polymerized basis) of 29% DOM, 21% VAc, 43% 2-EHA, 5% MMA, 1% AA, and 1% MAA.

Comparative Example 1

Avery Dennison Corporation (Pasadena, Calif.) manufactures a self-adhesive postage stamp PSA which is an emulsion acrylic copolymer of 29% DOM, 21% VAc, 48% 2-EHA, 1% AA, and 1% MAA. The polymer contains no MMA.

Comparative Example 2

An emulsion acrylic copolymer was prepared using sequential polymerization of a mixture of monomers: 29% DOM, 21% VAc, 43% 2-EHA, 1% AA, 1% MAA, and 5% MA, and 0.1% by weight (based on the weight of monomers) of n-DDM as a chain transfer agent.

Adhesive Performance and Water Removability

A set of simulated postage stamp constructions (lacking postage indicia) was prepared by coating an adhesive on a release liner, allowing it to dry, and laminating the adhesive to a face stock having opposed first and second faces. For Example 1, prepared as described above, enough adhesive was used to obtain a target coat weight of about 25 grams per square meter (gsm) after drying. Actual average coat weights ranged from 20 gsm to 25 gsm. Comparative Example 1, an emulsion acrylic PSA made by Avery Dennison Corp. (Pasadena, Calif.), was used as a "Control." It was coated on a release liner at a target coat weight of 23 gsm, and laminated to a face stock. Actual average coat weights ranged from 21.20 gsm to 22.75 gsm. Several different face stocks and release liners were tested.

Table 2 presents data for 90° peel adhesion from a stainless steel panel, for several adhesive laminate constructions. 90° peel adhesion is a measure of the force required to remove an adhesive-coated flexible face stock from a test panel after a specified period of dwell, at a 90° angle. It was determined in accordance with the May 1, 1998 USPS-P-XXXX test procedure "Peel Adhesion (90°)—Facestock From Test Panel, incorporated by reference herein. Test specimens were one inch (2.5 cm) wide and a minimum of six inches (15.2 cm) long. Each specimen was conditioned for 24 hours at 73°±2° F. (23±1° C.) and a relative humidity of 50±2%, and then tested under the same conditions, unless otherwise specified. A stainless steel panel 2×5×1/16" (5×12.2.2×0.4cm) having a bright annealed finish was used. The steel conforms to ASTM A 666 type 302 or 304 (AISI No. 302 and No. 304). Tests were conducted on a TLMI release and adhesion tester or equivalent product. Each specimen was applied, adhesive side down, to the clean test panel, leaving one inch (2.5 cm) of the 6-inch (15.2 cm) specimen extending past the test surface. A rubber cover roller (described below and in the USPS test procedure) was passed over the specimen twice (once in each direction). Any specimens having air bubbles after being rolled were discarded, and new specimens were prepared. Each specimen was prepared individually and allowed to dwell for ten minutes. The adhesive was folded part way back against itself and clamped into the tester, and the machine was started operating at a speed of 12 inches (30.5 cm) per minute. The above test procedure was repeated on five specimens and the results were averaged. Results were reported in pounds per inch. Possible adhesive failure modes include paper tear (PT), panel failure (P), fiber pick (FP), cohesive failure (C), light panel stain (Lps), and zippy (Z), the latter denoting a slip-stick, jerky release from the test panel.

TABLE 2

| Facestock/ | Unaged | | | |
|---|---|---|---|---|
| | Example 1 | | Control | |
| Liner | 90° Peel | Failure[10] | 90° Peel | Failure |
| W-40[1] | 3.2 | FT | 2.1 | Cl |
| W-50[2] | 3.3 | FT | 3.0 | L, Cl |
| W-80[3] | 3.1 | FT | 2.1 | Cl |
| G-40[4] | 2.9 | FT | 2.3 | L, FT |
| G-50[5] | 3.1 | FT | 2.8 | L, FT |
| G-80[6] | 2.5 | FT | 2.2 | L, Cl |
| T-40[7] | 2.9 | FT | 2.2 | FT |
| T-50[8] | 3.1 | FT | 2.7 | FT |
| T-80[9] | 2.7 | FT | 2.0 | FT |

| | Example 1 | | Control | | Example 1 | | Control | |
|---|---|---|---|---|---|---|---|---|
| | 90° Peel | Failure | 90° Peel | Failure | 90° Peel | Failure | 90° Peel | Failure |
| | Aged 3 wks at Room Temperature | | | | Aged 6 wks at Room Temperature | | | |
| W-40[1] | 2.7 | FT | 2.2 | Cl | 3.3 | FT | 2.2 | Cl |
| W-50[2] | 2.7 | FT | 2.4 | Cl | 2.8 | FT | 2.5 | SL, Cl |
| W-80[3] | 3.2 | FT | 2.1 | Cl | 3.1 | FT | 2.1 | Cl |
| G-40[4] | 2.6 | FT | 2.1 | Cl | 3.2 | FT | 2.2 | Cl |
| G-50[5] | 2.4 | FT | 2.3 | L, FT | 2.9 | FT | 2.5 | L, FT |
| G-80[6] | 2.6 | FT | 2.0 | Cl | 2.6 | FT | 2.0 | Cl |
| T-40[7] | 2.8 | FT | 2.4 | Cl | 2.7 | Cl | 2.4 | Cl |
| T-50[8] | 2.8 | FT | 2.5 | Cl | 2.7 | FT | 2.4 | Cl |
| T-80[9] | 2.5 | FT | 2.2 | Cl | 2.4 | FT | 2.1 | Cl |
| | Aged 3 wks at −40° C. | | | | Aged 6 wks at −40° C. | | | |
| W-40[1] | 3.1 | FT | 2.4 | Cl | 2.9 | FT | 2.2 | Cl |
| W-50[2] | 2.9 | FT | 2.3 | Cl | 2.8 | FT | 2.5 | SL, Cl |
| W-80[3] | 3.2 | FT | 2.2 | Cl | 2.9 | FT | 2 | Cl |
| G-40[4] | 3.0 | FT | 2.1 | FT | 3.1 | FT | 2.2 | SL, Cl |
| G-50[5] | 2.6 | FT | 2.4 | L, FT | 2.6 | FT | 2.7 | L, T, FT |
| G-80[6] | 2.9 | FT | 2.0 | Cl | 2.5 | FT | 2.1 | Cl |
| T-40[7] | 2.7 | FT | 2.4 | Cl | 2.7 | Cl | 2.5 | Cl |
| T-50[8] | 2.6 | FT | 2.4 | Cl | 2.8 | FT | 2.6 | FT |
| T-80[9] | 2.7 | FT | 2.2 | Cl | 2.5 | FT | 2.2 | Cl |
| | Aged 3 wks at 70° C. | | | | Aged 6 wks at 70° C. | | | |
| W-40[1] | 3.0 | FT | 2.2 | Cl | 3.2 | FT | 2.1 | Cl |
| W-50[2] | 2.8 | FT | 2.3 | Cl | 3.0 | FT | 2.3 | Cl |
| W-80[3] | 3.1 | FT | 1.9 | Cl | 3.0 | FT | 1.7 | Cl |
| G-40[4] | 2.7 | FT | 2.1 | Cl | 2.8 | FT | 2.2 | FT |
| G-50[5] | 2.8 | FT | 2.0 | FT | 2.9 | FT | 2.3 | FT |
| G-80[6] | 2.5 | FT | 1.6 | SS | 2.7 | FT | 1.6 | Cl |
| T-40[7] | 2.7 | FT | 2.5 | Cl | 2.5 | FT | 2.4 | Cl |
| T-50[8] | 2.6 | FT | 2.2 | FT | 2.7 | FT | 2.5 | FT |
| T-80[9] | 2.5 | FT | 1.8 | SS | 2.5 | FT | 2.8 | Cl |

TABLE 2-continued

|  | Aged 3 wks at 90% Rel. Humidity | | | | Aged 6 wks at 90% Rel. Humidity | | | |
| --- | --- | --- | --- | --- | --- | --- | --- | --- |
| W-40[1] | 2.9 | FT | 2.3 | Cl | 2.8 | FT | 2.1 | L, Cl |
| W-50[2] | 2.8 | FT | 2.3 | Cl | 3.0 | FT | 2.0 | Cl |
| W-80[3] | 2.9 | FT | 1.8 | Cl | 2.9 | FT | 1.4 | Cl |
| G-40[4] | 2.7 | FT | 2.2 | SL, Cl | 2.7 | FT | 1.7 | SL, Cl |
| G-50[5] | 2.6 | FT | 2.1 | FT | 2.6 | FT | 2.1 | FT |
| G-80[6] | 2.5 | FT | 1.5 | SS | 2.5 | FT | 1.5 | Cl |
| T-40[7] | 2.3 | FT | 1.8 | Cl | 2.3 | FT | 1.7 | Cl |
| T-50[8] | 2.6 | FT | 2.2 | FT | 2.4 | FT | 2.0 | Cl |
| T-80[9] | 2.3 | FT | 1.6 | Cl | 2.2 | FT | 1.3 | Cl |

Notes
[1]International Paper 921-17, 40# Supercalendered Kraft; 8130 Silicone
[2]Ex. 1: Glatfelter LKA2170, 52# Superior Liner Base; CR2081 Silicone;
 Control: Consolidated 927-18, #50 Point C2S: CR2083 Silicone
[3]Ex. 1: Glatfelter LKA2169, 80# USPS Liner Base; CR2081 Silicone;
 Control: Plainwell 927-76, 80# C2S Dull SC; 8120 Silicone
[4]International Paper 921-17, 40# Supercalendered Kraft; 8130 Silicone
[5]Ex. 1: Glatfelter LKA2170, 52# Superior Liner Base; CR2081 Silicone;
 Control: Consolidated 927-18, #50 Point C25; CR2083 Silicone
[6]Ex. 1: Glatfelter LKA2169, 80# USPS Liner Base; CR2081 Silicone;
 Control: Plainwell 927-76, 80# C2S Dull SC; 8120 Silicone
[7]International Paper 921-17, 40# Supercalendered Kraft; 8130 Silicone
[8]Ex. 1: Glatfelter LKA2170, 52# Superior Liner Base; CR2081 Silicone;
 Control: Consolidated 927-18, #50 Point C2S; CR2083 Silicone
[9]Ex. 1: Glatfelter LKA2169, 80# USPS Liner Base; CR2081 Silicone;
 Control: Plainwell 927-76, 80# C2S Dull SC; 8120 Silicone
[10]Failure modes: Clean (Cl), Face Tear (FT), Leggy (L), Slightly Leggy (SL),
 Transfer (T), Slight Stain (SS)

As indicated in Table 2, regardless of the face stock/liner and the aging conditions, the new adhesive exhibited 90° peel adhesion superior to that of the control in nearly every case.

Table 3 presents adhesive permanence data for simulated postage stamp constructions made with different face stocks and release liners, on four different envelope substrates (bond, kraft, recycled paper, and wove) that conform to United States Postal Service specifications. Tests were conducted on "unaged" samples at ambient temperature and humidity (23° C., 50% RH), and on samples aged for three or six weeks at 23°, −40°, 70°, or 90° C.

Adhesive permanence was measured by coating the adhesive on a release liner and then transferring the adhesive to a paper face stock. A 1-inch by 1-inch sample of each aged or unaged construction was adhered to an envelope substrate by applying pressure with a rubber covered roller, passing the roller over the stamp at a rate of 12 inches per minute in both a back and forth direction (two passes). After a 30 minute or 24 hour dwell on the substrate, the sample was removed by peeling from one corner at a 135° peel angle at a rate of 12 inches per minute. The following 0–5 rating system was used to rank the relative amount of fiber tear observed in the peel test:

5 Stamp tears or 100% of the removed stamp is covered by envelope fibers.

4 Area of removed stamp covered by envelope fibers is more than 50% but less than 100%.

3 Area of removed stamp covered by envelope fibers is less than 50% but more than 0%.

2 Fiber pick up or distortion of the envelope surface.

1 No fiber pick or envelope distortion but high adhesive strength.

0 No fiber pick or envelope distortion, minimal force required to remove stamp.

A score of 3 or higher is considered to "pass" USPS requirements.

TABLE 3

| | | | Adhesive Permanence | | | | | | | | | |
| --- | --- | --- | --- | --- | --- | --- | --- | --- | --- | --- | --- | --- |
| Aging | | Envelope | Ex. 1 | | Control | | Ex. 1 | | Control | | Ex. 1 | | Control |
| Condition | Time | Type | 30 min | 24 hr | 30 min | 24 hr | 30 min | 24 hr | 30 min | 24 hr | 30 min | 24 hr | 30 min | 24 hr |
| | | | W-40 Face/Liner | | | | W-50 Face/Liner | | | | W-80 Face/Liner | | | |
| Room Temp. | Initial | Bond | 5.0 | 5.0 | 1.5 | 2.5 | 4.8 | 5.0 | 2.0 | 1.5 | 5.0 | 5.0 | 1.0 | 1.8 |
| | | Kraft | 3.8 | 4.3 | 3.3 | 4.0 | 3.5 | 4.8 | 4.3 | 3.3 | 3.5 | 4.8 | 3.3 | 4.0 |
| | | Recycled | 4.5 | 5.0 | 4.0 | 4.8 | 4.3 | 4.5 | 4.5 | 4.3 | 4.8 | 4.3 | 4.3 | 4.3 |
| | | Wove | 4.5 | 5.0 | 4.0 | 4.8 | 4.8 | 5.0 | 2.5 | 2.8 | 4.8 | 4.8 | 4.0 | 4.3 |
| Room Temp. | 3 Weeks | Bond | 2.3 | 3.5 | 1.0 | 3.0 | 2.5 | 3.3 | 0.0 | 3.0 | 5.0 | 5.0 | 1.8 | 2.8 |
| | | Kraft | 4.5 | 4.5 | 3.5 | 4.0 | 3.5 | 4.5 | 3.8 | 4.0 | 4.0 | 4.3 | 3.3 | 4.0 |
| | | Recycled | 3.8 | 4.3 | 4.0 | 4.0 | 4.5 | 4.0 | 4.3 | 4.3 | 4.0 | 4.3 | 4.0 | 4.0 |
| | | Wove | 4.3 | 4.3 | 4.0 | 4.0 | 3.3 | 4.3 | 3.3 | 2.8 | 4.3 | 4.8 | 4.0 | 4.0 |
| Room Temp. | 6 Weeks | Bond | 3.3 | 4.5 | 1.8 | 2.0 | 3.8 | 3.3 | 2.0 | 2.0 | 3.0 | 3.8 | 2.0 | 2.5 |
| | | Kraft | 3.8 | 4.0 | 4.3 | 4.3 | 4.3 | 4.3 | 4.0 | 4.0 | 4.3 | 4.0 | 4.3 | 3.8 |

TABLE 3-continued

Adhesive Permanence

| Aging Condition | Time | Envelope Type | Ex. 1 30 min | Ex. 1 24 hr | Control 30 min | Control 24 hr | Ex. 1 30 min | Ex. 1 24 hr | Control 30 min | Control 24 hr | Ex. 1 30 min | Ex. 1 24 hr | Control 30 min | Control 24 hr |
|---|---|---|---|---|---|---|---|---|---|---|---|---|---|---|
| | | Recycled | 4.3 | 4.3 | 4.0 | 4.3 | 4.3 | 4.0 | 4.0 | 4.3 | 4.0 | 4.0 | 4.3 | 4.3 |
| | | Wove | 4.0 | 4.3 | 4.0 | 4.5 | 4.3 | 4.5 | 4.0 | 4.0 | 4.0 | 4.3 | 4.0 | 4.0 |
| −40° C. | 3 Weeks | Bond | 2.8 | 4.0 | 1.0 | 3.3 | 1.3 | 4.0 | 0.8 | 2.8 | 3.8 | 5.0 | 2.5 | 2.0 |
| | | Kraft | 4.3 | 4.5 | 3.8 | 4.3 | 3.5 | 4.3 | 4.0 | 4.3 | 4.0 | 3.8 | 3.8 | 4.0 |
| | | Recycled | 4.3 | 4.8 | 4.0 | 4.0 | 4.0 | 4.3 | 4.3 | 4.3 | 4.0 | 4.5 | 4.0 | 4.0 |
| | | Wove | 3.8 | 4.3 | 4.3 | 4.0 | 2.8 | 4.5 | 4.0 | 3.0 | 4.3 | 4.5 | 4.3 | 4.3 |
| −40° C. | 6 Weeks | Bond | 2.5 | 4.0 | 0.8 | 2.5 | 2.8 | 4.0 | 2.0 | 2.5 | 2.8 | 3.8 | 2.0 | 2.3 |
| | | Kraft | 4.3 | 4.5 | 4.0 | 4.0 | 3.8 | 4.3 | 3.5 | 4.0 | 4.0 | 4.0 | 4.0 | 4.0 |
| | | Recycled | 4.3 | 4.0 | 4.0 | 4.0 | 4.3 | 4.3 | 4.0 | 4.3 | 4.0 | 4.5 | 4.0 | 4.3 |
| | | Wove | 4.3 | 4.3 | 4.0 | 4.3 | 4.0 | 4.5 | 4.0 | 4.3 | 3.5 | 4.0 | 4.3 | 4.0 |
| 70° C. | 3 Weeks | Bond | 2.8 | 3.0 | 1.0 | 2.0 | 3.3 | 4.0 | 3.8 | 4.0 | 3.3 | 5.0 | 0.8 | 1.5 |
| | | Kraft | 3.8 | 4.3 | 4.0 | 4.0 | 3.5 | 5.0 | 4.0 | 4.5 | 3.0 | 4.5 | 3.3 | 3.8 |
| | | Recycled | 4.3 | 4.3 | 4.0 | 4.3 | 4.3 | 4.3 | 4.3 | 4.3 | 4.0 | 4.3 | 4.0 | 4.0 |
| | | Wove | 2.8 | 4.5 | 4.0 | 4.0 | 2.8 | 4.3 | 4.0 | 4.8 | 4.3 | 4.5 | 4.0 | 4.3 |
| 70° C. | 6 Weeks | Bond | 3.0 | 4.8 | 1.3 | 3.8 | 2.8 | 3.0 | 2.5 | 2.8 | 3.0 | 3.5 | 2.5 | 1.5 |
| | | Kraft | 3.8 | 4.3 | 4.0 | 4.3 | 3.3 | 4.0 | 4.0 | 4.0 | 3.8 | 4.0 | 4.0 | 4.0 |
| | | Recycled | 4.0 | 4.0 | 4.0 | 4.3 | 4.3 | 4.3 | 4.0 | 4.0 | 4.0 | 4.8 | 4.0 | 4.0 |
| | | Wove | 3.5 | 4.8 | 4.0 | 4.5 | 3.3 | 4.5 | 4.3 | 4.3 | 4.3 | 4.0 | 4.0 | 4.0 |
| 90° C. | 3 Weeks | Bond | 2.3 | 3.0 | 0.3 | 0.0 | 1.5 | 5.8 | 2.3 | 3.5 | 3.3 | 5.0 | 0.0 | 0.0 |
| | | Kraft | 3.5 | 4.0 | 3.3 | 4.0 | 3.5 | 4.0 | 3.3 | 4.3 | 4.0 | 3.5 | 2.8 | 4.0 |
| | | Recycled | 4.0 | 4.0 | 4.0 | 4.0 | 4.0 | 4.0 | 4.3 | 4.8 | 3.3 | 4.0 | 4.0 | 4.0 |
| | | Wove | 2.8 | 4.3 | 4.0 | 4.0 | 2.8 | 4.0 | 3.3 | 4.0 | 3.0 | 4.3 | 4.0 | 4.0 |
| 90° C. | 6 Weeks | Bond | 2.0 | 3.8 | 0.0 | 0.0 | 3.0 | 3.0 | 1.0 | 2.3 | 2.3 | 2.8 | 0.0 | 1.8 |
| | | Kraft | 3.3 | 4.0 | 3.5 | 3.8 | 3.3 | 4.0 | 3.0 | 3.3 | 3.8 | 3.8 | 4.0 | 3.8 |
| | | Recycled | 4.0 | 4.3 | 4.0 | 4.3 | 4.0 | 4.3 | 4.0 | 4.0 | 4.0 | 4.5 | 4.0 | 4.0 |
| | | Wove | 4.0 | 4.0 | 4.0 | 3.8 | 4.0 | 4.0 | 4.0 | 4.0 | 3.3 | 3.5 | 4.0 | 4.0 |
| | | | G-40 Face/Liner | | | | G-50 Face/Liner | | | | G-80 Face/Liner | | | |
| Room Temp. | Initial | Bond | 5.0 | 5.0 | 3.0 | 3.8 | 5.0 | 5.0 | 5.0 | 5.0 | 5.0 | 5.0 | 2.0 | 4.3 |
| | | Kraft | 4.5 | 4.8 | 4.3 | 4.0 | 5.0 | 4.8 | 5.0 | 4.5 | 4.5 | 4.8 | 3.5 | 4.3 |
| | | Recycled | 4.5 | 5.0 | 4.5 | 4.3 | 4.3 | 4.5 | 4.8 | 4.8 | 4.0 | 4.5 | 4.3 | 4.8 |
| | | Wove | 5.0 | 5.0 | 4.5 | 4.5 | 5.0 | 5.0 | 4.8 | 5.0 | 4.5 | 5.0 | 4.3 | 4.3 |
| Room Temp. | 3 Weeks | Bond | 4.0 | 5.0 | 4.0 | 4.5 | 4.0 | 5.0 | 4.5 | 5.0 | 3.5 | 5.0 | 0.3 | 3.8 |
| | | Kraft | 4.3 | 4.5 | 4.0 | 4.5 | 4.8 | 4.5 | 4.3 | 5.0 | 4.0 | 4.3 | 3.0 | 4.0 |
| | | Recycled | 4.3 | 4.5 | 4.5 | 4.5 | 4.8 | 4.5 | 4.3 | 4.8 | 4.3 | 4.3 | 4.3 | 4.3 |
| | | Wove | 4.5 | 4.8 | 4.0 | 4.5 | 3.8 | 5.0 | 3.8 | 5.0 | 3.3 | 5.0 | 4.0 | 4.5 |
| Room Temp. | 6 Weeks | Bond | 3.0 | 4.5 | 2.5 | 3.0 | 4.0 | 5.0 | 2.0 | 2.3 | 4.0 | 4.8 | 4.3 | 2.5 |
| | | Kraft | 4.3 | 4.5 | 4.5 | 4.5 | 4.8 | 4.8 | 4.0 | 4.0 | 4.3 | 4.5 | 4.3 | 4.0 |
| | | Recycled | 4.0 | 4.5 | 4.3 | 4.5 | 4.3 | 4.5 | 4.0 | 4.0 | 4.0 | 4.5 | 4.8 | 4.3 |
| | | Wove | 3.0 | 5.0 | 4.3 | 4.5 | 4.0 | 4.5 | 4.3 | 4.0 | 4.0 | 4.8 | 4.0 | 4.3 |
| −40° C. | 3 Weeks | Bond | 5.0 | 5.0 | 3.0 | 4.5 | 2.3 | 5.0 | 4.0 | 5.0 | 1.0 | 5.0 | 1.5 | 2.8 |
| | | Kraft | 4.8 | 4.5 | 4.0 | 4.0 | 4.0 | 4.0 | 4.5 | 4.8 | 4.0 | 4.5 | 2.0 | 4.0 |
| | | Recycled | 4.3 | 4.5 | 4.3 | 4.3 | 4.5 | 4.8 | 4.3 | 4.5 | 4.5 | 4.5 | 4.0 | 4.5 |
| | | Wove | 3.5 | 4.5 | 4.5 | 4.0 | 3.5 | 4.5 | 4.5 | 5.0 | 3.5 | 4.5 | 4.0 | 4.0 |
| −40° C. | 6 Weeks | Bond | 3.3 | 4.5 | 2.0 | 4.3 | 2.8 | 3.8 | 1.8 | 3.0 | 2.8 | 3.0 | 5.0 | 3.0 |
| | | Kraft | 4.3 | 4.3 | 4.0 | 4.0 | 4.3 | 4.5 | 3.8 | 4.5 | 4.8 | 4.3 | 4.3 | 4.0 |
| | | Recycled | 4.3 | 4.3 | 4.0 | 4.5 | 4.0 | 5.0 | 4.0 | 4.0 | 4.0 | 4.0 | 4.3 | 4.3 |
| | | Wove | 3.0 | 4.5 | 4.8 | 4.0 | 3.8 | 4.5 | 4.0 | 4.0 | 4.3 | 5.0 | 4.0 | 4.3 |
| 70° C. | 3 Weeks | Bond | 2.0 | 5.0 | 4.0 | 3.3 | 3.3 | 5.0 | 1.5 | 5.0 | 3.0 | 5.0 | 0.3 | 3.5 |
| | | Kraft | 4.3 | 5.0 | 3.8 | 4.3 | 4.5 | 4.8 | 3.0 | 5.0 | 3.3 | 3.8 | 2.8 | 3.5 |
| | | Recycled | 4.5 | 5.0 | 4.0 | 4.3 | 4.5 | 4.8 | 4.0 | 5.0 | 4.3 | 4.8 | 4.0 | 4.5 |
| | | Wove | 4.0 | 5.0 | 4.3 | 4.5 | 4.5 | 4.8 | 4.3 | 5.0 | 3.5 | 4.8 | 4.0 | 4.0 |
| 70° C. | 6 Weeks | Bond | 3.5 | 4.3 | 3.0 | 4.3 | 3.3 | 4.5 | 1.8 | 3.0 | 3.3 | 4.5 | 4.5 | 2.3 |
| | | Kraft | 4.3 | 4.5 | 4.3 | 5.0 | 3.8 | 5.0 | 4.0 | 4.8 | 4.3 | 4.5 | 4.5 | 3.8 |
| | | Recycled | 4.3 | 4.3 | 4.5 | 4.8 | 4.3 | 4.8 | 4.3 | 4.0 | 4.5 | 4.0 | 4.5 | 4.5 |
| | | Wove | 4.0 | 5.0 | 4.3 | 4.5 | 3.5 | 4.8 | 4.0 | 4.3 | 4.0 | 4.3 | 4.0 | 4.0 |
| 90° C. | 3 Weeks | Bond | 2.0 | 5.0 | 2.8 | 0.8 | 2.0 | 5.0 | 1.8 | 5.0 | 2.5 | 5.0 | 0.0 | 0.0 |
| | | Kraft | 4.0 | 3.5 | 3.5 | 4.0 | 3.5 | 3.3 | 3.0 | 4.3 | 3.3 | 3.5 | 0.0 | 3.8 |
| | | Recycled | 4.0 | 4.0 | 4.0 | 4.0 | 4.0 | 4.0 | 4.0 | 5.0 | 4.0 | 4.0 | 4.0 | 4.0 |
| | | Wove | 2.8 | 4.0 | 4.0 | 4.3 | 3.0 | 4.0 | 4.0 | 5.0 | 3.0 | 4.0 | 4.0 | 4.0 |
| 90° C. | 6 Weeks | Bond | 2.0 | 4.5 | 0.0 | 0.0 | 2.3 | 3.5 | 1.3 | 1.0 | 2.5 | 3.8 | 3.5 | 0.0 |
| | | Kraft | 3.5 | 4.0 | 3.5 | 4.0 | 3.3 | 4.0 | 3.0 | 4.0 | 4.3 | 4.0 | 3.0 | 3.5 |
| | | Recycled | 4.0 | 4.3 | 4.0 | 4.0 | 4.0 | 4.3 | 4.0 | 4.0 | 4.0 | 4.0 | 4.0 | 4.0 |
| | | Wove | 3.3 | 4.3 | 4.0 | 3.5 | 3.3 | 4.3 | 4.0 | 4.3 | 3.3 | 4.0 | 4.0 | 2.8 |
| | | | T-40 Face/Liner | | | | T-50 Face/Liner | | | | T-80 Face/Liner | | | |
| Room Temp. | Initial | Bond | 3.8 | 4.0 | 1.0 | 4.0 | 3.8 | 4.3 | 4.5 | 1.5 | 3.0 | 4.5 | 2.0 | 3.0 |
| | | Kraft | 4.0 | 4.3 | 3.3 | 4.5 | 4.0 | 4.5 | 4.5 | 3.8 | 3.5 | 4.0 | 3.8 | 4.0 |
| | | Recycled | 4.3 | 4.5 | 4.5 | 4.8 | 4.3 | 4.5 | 4.5 | 4.5 | 4.3 | 4.0 | 4.5 | 4.5 |
| | | Wove | 4.5 | 4.5 | 4.3 | 4.8 | 4.3 | 4.5 | 1.8 | 5.0 | 4.3 | 4.3 | 4.0 | 4.5 |
| Room Temp. | 3 Weeks | Bond | 3.3 | 4.0 | 3.5 | 3.0 | 2.5 | 4.3 | 0.8 | 1.0 | 1.3 | 3.8 | 1.0 | 1.5 |
| | | Kraft | 3.5 | 4.3 | 4.0 | 4.5 | 3.0 | 4.0 | 4.0 | 3.5 | 3.3 | 4.3 | 2.8 | 4.3 |
| | | Recycled | 4.3 | 4.0 | 4.5 | 4.3 | 4.5 | 4.3 | 4.3 | 4.5 | 4.0 | 4.0 | 4.0 | 4.3 |

TABLE 3-continued

Adhesive Permanence

| Aging Condition | Time | Envelope Type | Ex. 1 30 min | Ex. 1 24 hr | Control 30 min | Control 24 hr | Ex. 1 30 min | Ex. 1 24 hr | Control 30 min | Control 24 hr | Ex. 1 30 min | Ex. 1 24 hr | Control 30 min | Control 24 hr |
|---|---|---|---|---|---|---|---|---|---|---|---|---|---|---|
| Room Temp. | 6 Weeks | Wove | 4.3 | 4.0 | 4.0 | 4.3 | 3.0 | 4.5 | 3.8 | 3.5 | 3.0 | 4.3 | 4.0 | 4.3 |
| | | Bond | 3.3 | 4.0 | 2.3 | 4.3 | 3.8 | 4.3 | 1.3 | 3.0 | 2.3 | 3.0 | 1.3 | 2.0 |
| | | Kraft | 3.8 | 4.8 | 4.3 | 4.5 | 4.5 | 4.5 | 4.0 | 4.0 | 3.5 | 4.0 | 4.0 | 4.0 |
| | | Recycled | 4.3 | 4.8 | 4.0 | 4.3 | 3.8 | 5.0 | 4.0 | 4.3 | 4.0 | 4.3 | 4.0 | 4.3 |
| −40° C. | 3 Weeks | Wove | 3.8 | 4.0 | 4.0 | 4.3 | 4.0 | 5.0 | 4.3 | 4.5 | 3.8 | 4.0 | 4.3 | 4.0 |
| | | Bond | 2.8 | 3.5 | 3.3 | 2.5 | 2.8 | 3.5 | 1.8 | 1.8 | 2.0 | 3.5 | 0.8 | 1.8 |
| | | Kraft | 3.8 | 4.5 | 4.5 | 4.0 | 4.0 | 4.0 | 4.0 | 4.0 | 3.0 | 4.3 | 3.8 | 4.3 |
| | | Recycled | 4.3 | 4.3 | 4.0 | 4.0 | 4.3 | 4.5 | 4.0 | 4.8 | 4.0 | 4.3 | 4.0 | 4.5 |
| −40° C. | 6 Weeks | Wove | 3.5 | 4.3 | 4.3 | 4.3 | 3.0 | 4.3 | 4.5 | 4.5 | 3.0 | 4.3 | 4.0 | 4.0 |
| | | Bond | 3.0 | 4.3 | 2.3 | 2.0 | 2.3 | 5.0 | 1.3 | 2.3 | 2.3 | 3.0 | 1.3 | 2.8 |
| | | Kraft | 4.0 | 4.0 | 4.3 | 4.0 | 3.8 | 4.5 | 4.3 | 4.3 | 3.5 | 4.0 | 4.0 | 4.5 |
| | | Recycled | 4.3 | 4.5 | 4.0 | 4.3 | 4.3 | 5.0 | 4.0 | 4.3 | 4.0 | 4.0 | 4.3 | 4.0 |
| 70° C. | 3 Weeks | Wove | 4.0 | 4.3 | 4.3 | 4.3 | 4.3 | 5.0 | 4.3 | 4.3 | 3.0 | 4.0 | 4.0 | 4.0 |
| | | Bond | 2.3 | 4.5 | 3.3 | 2.0 | 3.0 | 4.3 | 1.3 | 2.3 | 2.8 | 4.0 | 0.3 | 1.3 |
| | | Kraft | 4.3 | 4.5 | 4.3 | 4.0 | 3.8 | 4.8 | 3.8 | 4.3 | 2.8 | 4.0 | 3.3 | 4.0 |
| | | Recycled | 4.3 | 4.5 | 4.3 | 4.3 | 4.3 | 4.3 | 4.0 | 4.5 | 4.5 | 4.5 | 4.0 | 4.0 |
| 70° C. | 6 Weeks | Wove | 3.3 | 4.5 | 4.0 | 4.3 | 4.8 | 4.5 | 3.0 | 3.5 | 3.0 | 4.8 | 4.0 | 4.3 |
| | | Bond | 4.5 | 3.8 | 2.8 | 3.5 | 4.8 | 4.5 | 4.3 | 1.3 | 2.5 | 3.3 | 0.3 | 3.3 |
| | | Kraft | 3.3 | 4.5 | 4.5 | 4.0 | 4.5 | 4.8 | 5.0 | 4.0 | 3.3 | 4.5 | 3.8 | 4.3 |
| | | Recycled | 4.5 | 5.0 | 4.5 | 4.3 | 4.3 | 5.0 | 4.0 | 4.0 | 4.0 | 4.8 | 4.3 | 4.3 |
| 90° C. | 3 Weeks | Wove | 4.0 | 4.8 | 4.0 | 4.0 | 4.3 | 5.0 | 4.5 | 4.3 | 2.8 | 4.5 | 4.3 | 4.5 |
| | | Bond | 2.5 | 3.5 | 4.5 | 3.5 | 1.3 | 3.3 | 0.0 | 0.8 | 1.5 | 3.0 | 0.0 | 0.0 |
| | | Kraft | 3.3 | 3.3 | 4.5 | 4.5 | 3.0 | 3.8 | 3.3 | 3.8 | 3.0 | 4.0 | 0.5 | 3.3 |
| | | Recycled | 4.3 | 4.3 | 4.3 | 4.3 | 4.3 | 4.0 | 4.0 | 4.0 | 4.0 | 4.0 | 4.3 | 4.0 |
| 90° C. | 6 Weeks | Wove | 4.0 | 4.0 | 4.0 | 4.5 | 3.0 | 3.8 | 2.5 | 3.8 | 2.8 | 4.0 | 4.0 | 4.0 |
| | | Bond | 1.8 | 2.3 | 4.3 | 0.8 | 2.5 | 3.0 | 1.0 | 2.0 | 1.3 | 2.8 | 0.0 | 0.8 |
| | | Kraft | 3.0 | 4.3 | 4.0 | 3.3 | 3.3 | 4.0 | 3.5 | 4.0 | 3.0 | 3.8 | 3.3 | 3.0 |
| | | Recycled | 4.0 | 4.3 | 4.3 | 4.0 | 4.0 | 5.0 | 4.0 | 4.0 | 4.0 | 4.0 | 4.0 | 4.0 |
| | | Wove | 3.5 | 4.0 | 4.0 | 3.8 | 4.3 | 4.3 | 4.3 | 4.3 | 2.5 | 3.0 | 4.0 | 3.8 |

The adhesive test results show that adhesives prepared in accordance with the present invention exhibit adhesive permanence far superior to that of the control, under essentially all test conditions.

Table 4 presents water removability data for several simulated postage stamps after adherence to different face stocks. The test for water removability measures the length of time required to separate stamp constructions from the substrates to which they are fixed. The possibility of blocking is also noted, based on the solubility of the adhesive in water or whether the adhesive remains on the stamp or on the substrate. An 8×8×2 inch dish or similar vessel suitable for soaking the appropriate amount of test specimens is filled with an adequate amount of water to ensure submersion of the test specimens. The envelope substrates used in the test were 24 lb. bond containing 25% cotton fiber, 28 lb. kraft, 24 lb. recycled wove and 24 lb. white wove. Eight stamp coupons constructions) for each exposure condition were tested. Four stamp constructions, evenly spaced, were affixed to a wove envelope with one pass of the rubber covered roller in each direction. (A steel roller that conforms to USPS test requirements, 1.75+/−0.5" in width, covered with rubber approximately 0.25" thick and having a Shore scale A durometer hardness of 75 to 85, with a roller weight of 4.5+/−0.1 lb. was used.) The envelope was aged for 24 hours before further testing. Similarly, stamp constructions were affixed to a bond, kraft, recycled and wove envelope. Each stamped envelope was cut into individual sections and labeled 5, 10, 20 and 30 minutes (abbreviated 5', 10', 20', 30' in the table). The test specimens were submerged from the wove envelope face down in 22 +/−2° C. water and soaked respectively for 5, 10, 20, and 30 minute intervals. The test specimens were removed at the appropriate time and the minimum time needed for complete removal of the adhesive from the stamp was determined. The test was discontinued after the next longer time confirmed that separation had occurred. The test was repeated with one stamp on each of the four envelope substrates at the minimum time determined above. The minimum time required to separate stamp from substrate was noted. In terms of blocking, each test specimen was rated based on the following guidelines for adhesive properties for each time interval:

5 Adhesive dissolves,

4 Stamp separates with adhesive on envelope substrate,

3 Stamp separates with adhesive on the stamp itself,

2 Stamp separates with a little fiber tear,

1 Stamp separates with a fiber tape; stamp is destroyed, etc.

The higher the average number, the better the stamp adhesive is as far as preventing any blocking.

As indicated in Table 4, the PSA of Example 1 exhibited water removability comparable to that of the control.

TABLE 4

Water Removability

| | | Wove 5' | | Wove 10' | | Wove 20' | | Wove 30' | | Removability Rating | | | | | | | |
| | | | | | | | | | | Bond | | Kraft | | Recycled | | Wove | |
| Aging Condition | Time | Ex. 1 | Con. | Ex. 1 | Con. | Ex. 1 | Con. | Ex. 1 | Con. | Ex. 1 | Con. | Ex. 1 | Con. | Ex. 1 | Con. | Ex. 1 | Con. |
|---|---|---|---|---|---|---|---|---|---|---|---|---|---|---|---|---|---|
| | | | | | | Face/Liner: W-40 | | | | | | | | | | | |
| Room Temp | Initial | 4 | 4 | 4 | 4 | | | | | 4/5 | 4/5 | 4/5 | 4/5 | 4/5 | 4/5 | 4/5 | 4/5 |
| | 3 Weeks | 3 | 4 | 4 | 4 | 4 | | | | 4/10 | 4/5 | 4/10 | 4/5 | 4/10 | 4/5 | 4/10 | 4/5 |
| | 6 Weeks | 4 | 4 | 4 | 4 | | | | | 4/5 | 4/5 | 4/5 | 4/5 | 4/5 | 4/5 | 4/5 | 4/5 |
| −40° C. | 3 Weeks | 4 | 4 | 4 | 4 | | | | | 4/5 | 4/5 | 4/5 | 4/5 | 4/5 | 4/5 | 4/5 | 4/5 |
| | 6 Weeks | 4 | 4 | 4 | 4 | | | | | 4/5 | 4/5 | 4/5 | 4/5 | 4/5 | 4/5 | 4/5 | 4/5 |
| 70° C. | 3 Weeks | 4 | 4 | 4 | 4 | | | | | 4/5 | 4/5 | 4/5 | 4/5 | 4/5 | 4/5 | 4/5 | 4/5 |
| | 6 Weeks | 4 | 4 | 4 | 4 | | | | | 4/5 | 4/5 | 4/5 | 4/5 | 4/5 | 4/5 | 4/5 | 4/5 |
| 90° C. | 3 Weeks | 4 | 4 | 4 | 4 | | | | | 4/5 | 4/5 | 4/5 | 4/5 | 4/5 | 3/5 | 4/5 | 4/5 |
| | 6 Weeks | 4 | 4 | 4 | 4 | | | | | 4/5 | 4/5 | 4/5 | 4/5 | 4/5 | 4/5 | 4/5 | 4/5 |
| | | | | | | Face/Liner: W50 | | | | | | | | | | | |
| Room Temp. | Initial | 4 | 4 | 4 | 4 | | | | | 4/5 | 4/5 | 4/5 | 4/5 | 4/5 | 4/5 | 4/5 | 4/5 |
| | 3 Weeks | 3 | 4 | 4 | 4 | 4 | | | | 4/10 | 4/5 | 4/10 | 4/5 | 4/10 | 4/5 | 4/10 | 4/5 |
| | 6 Weeks | 4 | 4 | 4 | 4 | | | | | 4/5 | 4/5 | 4/5 | 4/5 | 4/5 | 4/5 | 4/5 | 2/5 |
| −40° C. | 3 Weeks | 4 | 4 | 4 | 4 | | | | | 4/5 | 4/5 | 4/5 | 4/5 | 4/5 | 4/5 | 4/5 | 4/5 |
| | 6 Weeks | 4 | 4 | 4 | 4 | | | | | 4/5 | 4/5 | 4/5 | 4/5 | 4/5 | 4/5 | 4/5 | 4/5 |
| 70° C. | 3 Weeks | 4 | 4 | 4 | 4 | | | | | 4/5 | 4/5 | 4/5 | 4/5 | 4/5 | 4/5 | 4/5 | 4/5 |
| | 6 Weeks | 4 | 4 | 4 | 4 | | | | | 4/5 | 4/5 | 4/5 | 4/5 | 4/5 | 4/5 | 4/5 | 4/5 |
| 90° C. | 3 Weeks | 4 | 4 | 4 | 4 | | | | | 4/5 | 4/5 | 4/5 | 4/5 | 4/5 | 4/5 | 4/5 | 4/5 |
| | 6 Weeks | 4 | 4 | 4 | 4 | | | | | 4/5 | 4/5 | 4/5 | 4/5 | 4/5 | 4/5 | 4/5 | 4/5 |
| | | | | | | Face/Liner: W-80 | | | | | | | | | | | |
| Room Temp. | Initial | 4 | 4 | 4 | 4 | | | | | 4/5 | 4/5 | 4/5 | 4/5 | 4/5 | 4/5 | 4/5 | 4/5 |
| | 3 Weeks | 4 | 4 | 4 | 4 | | | | | 4/5 | 4/5 | 4/5 | 4/5 | 4/5 | 4/5 | 4/5 | 4/5 |
| | 6 Weeks | 4 | 4 | 4 | 4 | | | | | 4/5 | 4/5 | 4/5 | 4/5 | 4/5 | 4/5 | 4/5 | 4/5 |
| −40° C. | 3 Weeks | 4 | 4 | 4 | 4 | | | | | 4/5 | 4/5 | 4/5 | 4/5 | 4/5 | 4/5 | 4/5 | 4/5 |
| | 6 Weeks | 4 | 4 | 4 | 4 | | | | | 4/5 | 4/5 | 4/5 | 4/5 | 4/5 | 4/5 | 4/5 | 4/5 |
| 70° C. | 3 Weeks | 3 | 4 | 4 | 4 | 4 | | | | 4/10 | 4/5 | 4/10 | 4/5 | 4/10 | 4/5 | 4/10 | 4/5 |
| | 6 Weeks | 2 | 4 | 2 | 4 | 2 | | 2 | | 1/30 | 4/5 | 1/30 | 4/5 | 2/30 | 4/5 | 2/30 | 4/5 |
| 90° C. | 3 Weeks | 4 | 4 | 4 | 4 | | | | | 4/5 | 4/5 | 4/5 | 4/5 | 4/5 | 4/5 | 4/5 | 4/5 |
| | 6 Weeks | 4 | 4 | 4 | 4 | | | | | 4/5 | 4/5 | 4/5 | 4/5 | 4/5 | 4/5 | 4/5 | 4/5 |
| | | | | | | Face/Liner: G-40 | | | | | | | | | | | |
| Room Temp. | Initial | 4 | 4 | 4 | 4 | | | | | 4/5 | 4/5 | 4/5 | 4/5 | 4/5 | 4/5 | 4/5 | 4/5 |
| | 3 Weeks | 4 | 4 | 4 | 4 | | | | | 4/5 | 4/5 | 4/5 | 4/5 | 4/5 | 4/5 | 4/5 | 4/5 |
| | 6 Weeks | 4 | 4 | 4 | 4 | | | | | 4/5 | 4/5 | 4/5 | 4/5 | 4/5 | 4/5 | 4/5 | 4/5 |
| −40° C. | 3 Weeks | 4 | 4 | 4 | 4 | | | | | 4/5 | 4/5 | 4/5 | 4/5 | 4/5 | 4/5 | 4/5 | 2/5 |
| | 6 Weeks | 4 | 4 | 4 | 4 | | | | | 4/5 | 4/5 | 4/5 | 4/5 | 4/5 | 4/5 | 4/5 | 4/5 |
| 70° C. | 3 Weeks | 2 | 4 | 2 | 4 | 3 | | 4 | | 4/30 | 4/5 | 4/30 | 4/5 | 4/30 | 4/5 | 4/30 | 4/5 |
| | 6 Weeks | 2 | 4 | 2 | 4 | 2 | | 2 | | 4/30 | 4/5 | 1/30 | 4/5 | 1/30 | 4/5 | 2/30 | 4/5 |
| 90° C. | 3 Weeks | 4 | 4 | 4 | 4 | | | | | 4/5 | 4/5 | 4/5 | 4/5 | 4/5 | 4/5 | 4/5 | 3/5 |
| | 6 Weeks | 4 | 4 | 4 | 4 | | | | | 4/5 | 4/5 | 4/5 | 4/5 | 4/5 | 4/5 | 4/5 | 4/5 |
| | | | | | | Face/Liner: G-50 | | | | | | | | | | | |
| Room Temp. | Initial | 4 | 4 | 4 | 4 | | | | | 4/5 | 4/5 | 4/5 | 4/5 | 4/5 | 4/5 | 4/5 | 4/5 |
| | 3 Weeks | 3 | 4 | 2 | 4 | 4 | | 4 | | 4/20 | 4/5 | 4/20 | 4/5 | 4/20 | 4/5 | 4/20 | 4/5 |
| | 6 Weeks | 4 | 4 | 4 | 4 | | | | | 4/5 | 4/5 | 4/5 | 4/5 | 4/5 | 4/5 | 4/5 | 4/5 |
| −40° C. | 3 Weeks | 4 | 4 | 4 | 4 | | | | | 4/5 | 4/5 | 4/5 | 4/5 | 4/5 | 4/5 | 4/5 | 4/5 |
| | 6 Weeks | 4 | 4 | 4 | 4 | | | | | 4/5 | 4/5 | 4/5 | 4/5 | 4/5 | 4/5 | 4/5 | 4/5 |
| 70° C. | 3 Weeks | 4 | 2 | 4 | 4 | | | 4 | | 4/5 | 4/10 | 4/5 | 4/10 | 4/5 | 4/10 | 4/5 | 4/10 |
| | 6 Weeks | 4 | 2 | 4 | 4 | | | 4 | | 4/5 | 4/10 | 4/5 | 4/10 | 4/5 | 4/10 | 4/5 | 4/10 |
| 90° C. | 3 Weeks | 4 | 4 | 4 | 4 | | | | | 4/5 | 4/5 | 4/5 | 4/5 | 4/5 | 4/5 | 4/5 | 4/5 |
| | 6 Weeks | 4 | 4 | 4 | 4 | | | | | 4/5 | 4/5 | 4/5 | 4/5 | 4/5 | 4/5 | 4/5 | 4/5 |
| | | | | | | Face/Liner: G-80 | | | | | | | | | | | |
| Room Temp. | Initial | 4 | 4 | 4 | 4 | | | | | 4/5 | 4/5 | 4/5 | 4/5 | 4/5 | 4/5 | 4/5 | 4/5 |
| | 3 Weeks | 3 | 4 | 1 | 4 | 4 | | 4 | | 4/20 | 4/5 | 4/20 | 4/5 | 4/20 | 4/5 | 4/20 | 4/5 |
| | 6 Weeks | 4 | 4 | 4 | 4 | | | | | 4/5 | 4/5 | 4/5 | 4/5 | 4/5 | 4/5 | 4/5 | 4/5 |
| −40° C. | 3 Weeks | 4 | 4 | 4 | 4 | | | | | 4/5 | 4/5 | 4/5 | 4/5 | 4/5 | 4/5 | 4/5 | 4/5 |
| | 6 Weeks | 4 | 4 | 4 | 4 | | | | | 4/5 | 4/5 | 4/5 | 4/5 | 4/5 | 4/5 | 4/5 | 4/5 |
| 70° C. | 3 Weeks | 4 | 4 | 4 | 4 | | | | | 4/5 | 4/5 | 4/5 | 4/5 | 4/5 | 4/5 | 4/5 | 4/5 |
| | 6 Weeks | 4 | 4 | 4 | 4 | | | | | 4/5 | 4/5 | 4/5 | 2/5 | 4/5 | 4/5 | 4/5 | 2/5 |
| 90° C. | 3 Weeks | 4 | 4 | 4 | 4 | | | | | 4/5 | 4/5 | 4/5 | 4/5 | 4/5 | 4/5 | 4/5 | 4/5 |
| | 6 Weeks | 4 | 4 | 4 | 4 | | | | | 4/5 | 4/5 | 4/5 | 2/5 | 4/5 | 4/5 | 2/5 | 4/5 |
| | | | | | | Face/Liner: T-40 | | | | | | | | | | | |
| Room Temp. | Initial | 4 | 4 | 4 | 4 | | | | | 4/5 | 4/5 | 4/5 | 4/5 | 4/5 | 4/5 | 4/5 | 4/5 |
| | 3 Weeks | 4 | 4 | 4 | 4 | | | | | 4/5 | 4/5 | 4/5 | 4/5 | 4/5 | 4/5 | 4/5 | 4/5 |
| | 6 Weeks | 4 | 4 | 4 | 4 | | | | | 4/5 | 4/5 | 4/5 | 4/5 | 4/5 | 4/5 | 4/5 | 4/5 |

TABLE 4-continued

Water Removability

| | | Wove 5' | | Wove 10' | | Wove 20' | | Wove 30' | | Removability Rating | | | | | | | |
| | | | | | | | | | | Bond | | Kraft | | Recycled | | Wove | |
| Aging Condition | Time | Ex. 1 | Con. | Ex. 1 | Con. | Ex. 1 | Con. | Ex. 1 | Con. | Ex. 1 | Con. | Ex. 1 | Con. | Ex. 1 | Con. | Ex. 1 | Con. |
|---|---|---|---|---|---|---|---|---|---|---|---|---|---|---|---|---|---|
| −40° C. | 3 Weeks | 4 | 4 | 4 | 4 | | | | | 4/5 | 4/5 | 4/5 | 4/5 | 4/5 | 4/5 | 4/5 | 4/5 |
| | 6 Weeks | 4 | 4 | 4 | 4 | | | | | 4/5 | 4/5 | 4/5 | 4/5 | 4/5 | 4/5 | 4/5 | 4/5 |
| 70° C. | 3 Weeks | 4 | 4 | 4 | 4 | | | | | 4/5 | 4/5 | 4/5 | 4/5 | 4/5 | 4/5 | 4/5 | 4/5 |
| | 6 Weeks | 4 | 4 | 4 | 4 | | | | | 4/5 | 4/5 | 4/5 | 4/5 | 4/5 | 4/5 | 3/5 | 4/5 |
| 90° C. | 3 Weeks | 4 | 4 | 4 | 4 | | | | | 4/5 | 4/5 | 4/5 | 4/5 | 4/5 | 4/5 | 4/5 | 4/5 |
| | 6 Weeks | 4 | 4 | 4 | 4 | | | | | 4/5 | 4/5 | 4/5 | 4/5 | 4/5 | 4/5 | 4/5 | 3/5 |
| Face/Liner: T-40 | | | | | | | | | | | | | | | | | | |
| Room Temp. | Initial | 4 | 4 | 4 | 4 | | | | | 4/5 | 4/5 | 4/5 | 4/5 | 4/5 | 4/5 | 4/5 | 4/5 |
| | 3 Weeks | 4 | 4 | 4 | 4 | | | | | 4/5 | 4/5 | 4/5 | 4/5 | 4/5 | 4/5 | 4/5 | 4/5 |
| | 6 Weeks | 4 | 4 | 4 | 4 | | | | | 4/5 | 4/5 | 4/5 | 4/5 | 4/5 | 4/5 | 4/5 | 4/5 |
| −40° C. | 3 Weeks | 4 | 4 | 4 | 4 | | | | | 4/5 | 4/5 | 4/5 | 4/5 | 4/5 | 4/5 | 4/5 | 4/5 |
| | 6 Weeks | 4 | 4 | 4 | 4 | | | | | 4/5 | 4/5 | 4/5 | 4/5 | 4/5 | 4/5 | 4/5 | 4/5 |
| 70° C. | 3 Weeks | 4 | 4 | 4 | 4 | | | | | 4/5 | 4/5 | 4/5 | 4/5 | 4/5 | 4/5 | 4/5 | 4/5 |
| | 6 Weeks | 4 | 4 | 4 | 4 | | | | | 4/5 | 4/5 | 4/5 | 4/5 | 4/5 | 4/5 | 3/5 | 4/5 |
| 90° C. | 3 Weeks | 4 | 4 | 4 | 4 | | | | | 4/5 | 4/5 | 4/5 | 4/5 | 4/5 | 4/5 | 4/5 | 4/5 |
| | 6 Weeks | 4 | 4 | 4 | 4 | | | | | 4/5 | 4/5 | 4/5 | 4/5 | 4/5 | 4/5 | 4/5 | 4/5 |
| Face/Liner: T-50 | | | | | | | | | | | | | | | | | | |
| Room Temp. | Initial | 4 | 4 | 4 | 4 | | | | | 4/5 | 4/5 | 4/5 | 4/5 | 4/5 | 4/5 | 4/5 | 4/5 |
| | 3 Weeks | 4 | 4 | 4 | 4 | | | | | 4/5 | 4/5 | 4/5 | 4/5 | 4/5 | 4/5 | 4/5 | 4/5 |
| | 6 Weeks | 4 | 4 | 4 | 4 | | | | | 4/5 | 4/5 | 4/5 | 4/5 | 4/5 | 4/5 | 4/5 | 4/5 |
| −40° C. | 3 Weeks | 2 | 4 | 4 | 4 | 4 | | | | 4/10 | 4/5 | 4/10 | 4/5 | 4/10 | 4/5 | 4/10 | 4/5 |
| | 6 Weeks | 4 | 4 | 4 | 4 | | | | | 4/5 | 4/5 | 4/5 | 4/5 | 4/5 | 4/5 | 4/5 | 4/5 |
| 70° C. | 3 Weeks | 2 | 4 | 2 | 4 | 4 | | 4 | | 4/20 | 4/5 | 4/20 | 4/5 | 4/20 | 4/5 | 4/20 | 4/5 |
| | 6 Weeks | 3 | 4 | 3 | 4 | 4 | | 4 | | 4/20 | 4/5 | 1/20 | 4/5 | 1/20 | 4/5 | 3/20 | 4/5 |
| 90° C. | 3 Weeks | 4 | 4 | 4 | 4 | 4 | | | | 4/10 | 4/5 | 4/10 | 4/5 | 4/10 | 4/5 | 4/10 | 4/5 |
| | 6 Weeks | 4 | 4 | 4 | 4 | | | | | 4/5 | 4/5 | 4/5 | 4/5 | 4/5 | 4/5 | 4/5 | 4/5 |
| Face/Liner: T-50 | | | | | | | | | | | | | | | | | | |
| Room Temp. | Initial | 4 | 4 | 4 | 4 | | | | | 4/5 | 4/5 | 4/5 | 4/5 | 4/5 | 4/5 | 4/5 | 4/5 |
| | 3 Weeks | 4 | 4 | 4 | 4 | | | | | 4/5 | 4/5 | 4/5 | 4/5 | 4/5 | 4/5 | 4/5 | 4/5 |
| | 6 Weeks | 4 | 4 | 4 | 4 | | | | | 4/5 | 4/5 | 4/5 | 4/5 | 4/5 | 4/5 | 4/5 | 4/5 |
| −40° C. | 3 Weeks | 4 | 4 | 4 | 4 | | | | | 4/5 | 4/5 | 4/5 | 4/5 | 4/5 | 4/5 | 4/5 | 4/5 |
| | 6 Weeks | 4 | 4 | 4 | 4 | | | | | 4/5 | 4/5 | 4/5 | 4/5 | 4/5 | 4/5 | 4/5 | 4/5 |
| 70° C. | 3 Weeks | 4 | 4 | 4 | 4 | | | | | 4/5 | 4/5 | 4/5 | 4/5 | 4/5 | 4/5 | 4/5 | 4/5 |
| | 6 Weeks | 4 | 2 | 4 | 2 | | 4 | | 2 | 4/5 | 4/20 | 4/5 | 4/20 | 4/5 | 4/20 | 4/5 | 4/20 |
| 90° C. | 3 Weeks | 2 | 4 | 4 | 4 | 4 | | | | 4/10 | 4/5 | 4/10 | 4/5 | 4/10 | 4/5 | 4/10 | 4/5 |
| | 6 Weeks | 4 | 4 | 4 | 4 | | | | | 4/5 | 4/5 | 4/5 | 4/5 | 4/5 | 4/5 | 4/5 | 4/5 |

Comparative example 2, which contained no methyl methacrylate (MMA) and 5% methyl acrylate (MA) (based on the weight of all monomers), exhibited cohesive shear, repositionability, and permanency inferior to that of the control and Example 1. The presence of MMA in the polymer is essential to obtaining the advantages of the present invention.

The invention has been illustrated by preferred and exemplary embodiments, but is not limited thereto. Other modifications to the PSAs and self-adhesive stamp constructions can be made without departing from the invention. For example, in an alternative embodiment, a tackifier can be added to the PSA formulation to improve adhesion to certain substrates. Representative, nonlimiting examples of suitable tackifiers are found in U.S. Pat. Nos. 5,623,011 (Bernard), 4,477,613 (Evans et al.) and 4,654,389 (Graham et al.), each of which is incorporated herein by reference.

It will also be appreciated that the adhesive polymer can be prepared and/or applied to a face stock through means other than those described above. For example, an acrylic PSA can be prepared by bulk polymerization and then applied (or married to) a postage stamp face stock as a hot melt, rather than as an emulsion polymer. In another embodiment, the polymer can be prepared in solution and applied as a solvent-borne coating.

Throughout the text and the claims, use of the word "about" in relation to a range of numbers is intended to modify both the high and low values recited.

What is claimed is:

1. A pressure-sensitive adhesive, comprising:
   an emulsion copolymer formed in the presence of a nonionic, an anionic, and a reactive surfactant, made from a plurality of monomers that includes substantially no multifunctional monomers having a cyanurate or phosphate moiety, the plurality of monomers comprising, on a percent by weight basis, based on the total weight of monomers,
   (a) about 27 to 29% di-ethylhexyl maleate,
   (b) about 19 to 21% vinyl acetate,
   (c) about 40 to 43% ethylhexyl acrylate,
   (d) about 5 to 10% methyl methacrylate,
   (e) about 1% acrylic acid, and
   (f) about 1% methacrylic acid; wherein said copolymer has a gel content of 30–60% by weight.

* * * * *